United States Patent [19]

Evans

[11] 4,085,706

[45] Apr. 25, 1978

[54] COMBINED ANIMAL WEANING, WATERING AND FEEDING DISHES

[76] Inventor: Virginia Sunner Evans, 3471 S. Park Rd., Bethel Park, Pa. 15102

[21] Appl. No.: 754,190

[22] Filed: Dec. 27, 1976

[51] Int. Cl.² ............................................. A01K 5/00
[52] U.S. Cl. ...................................................... 119/61
[58] Field of Search ........................... 119/61, 72, 51.5

[56] References Cited

U.S. PATENT DOCUMENTS

| 1,332,554 | 3/1920 | Hoffner | 119/72 |
|---|---|---|---|
| 1,562,620 | 11/1925 | Dill | 119/61 |
| 3,491,724 | 1/1970 | Sunner | 119/61 |
| 3,698,594 | 10/1972 | Boehlert | 119/61 |

Primary Examiner—Hugh R. Chamblee
Attorney, Agent, or Firm—Buell, Blenko & Ziesenheim

[57] ABSTRACT

A combined animal weaning, watering and feeding dish having an outer dish with a flat bottom and vertically upstanding rim and an inner dish having an annular U-shaped trough with a central upstanding member acting as a guide for an animal's face and mouth into the food in the trough and discouraging walking or stepping into the food, said inner dish being removable from the outer dish and inverted to form a watering dish.

4 Claims, 4 Drawing Figures

COMBINED ANIMAL WEANING, WATERING AND FEEDING DISHES

This invention relates to combined animal weaning, watering and feeding dishes and particularly to a combined weaning, watering and feeding dish for puppies and adult animals.

The problems which are encountered by animal breeders in weaning young animals are generally well known. The problem of weaning puppies is typical of the problems of weaning animals of this type and will be used as an example throughout this specification. It is generally necessary for the person raising puppies to wean each puppy by hand. This is a very tedious chore particularly if the person has a large number of puppies that must be weaned at the same time. When the puppies are left to teach themselves to feed out of an ordinary feeding dish, they destroy more food than they consume by walking through it, by spilling it and by their general struggles in an effort to find the best way to reach the food and to consume it. A second very significant problem in caring for dogs arises during watering. About eighty percent of the dogs in the United States have drooping ears as distinguished from upstanding ears, such as one finds in the German shephard and Husky breeds. Dogs with drooping ears will get the tips, at least, of their ears wet each time they drink from a conventional watering bowl or trough. As a result, most kennels and show handlers will not permit their dogs to drink for some hours prior to displaying them in order to avoid this problem. I have invented a dish which eliminates these problems of weaning and watering and, at the same time, makes it possible to maintain a degree of warmth in the food comparable to that to which the puppy is accustomed. Moreover, my invention provides an adult feeding bowl when the puppies have been weaned and grown.

In a preferred form of my invention, I provide an outer dish member made up of a flat bottom and an upstanding annular rim. An inner dish member made up of an annular trough having an outer raised edge engaging the upstanding annular rim, a central upstanding member within the annulus of the trough extending upwardly above the plane of the outer edge of the trough. The central upstanding member within the annulus is hollow and flat on the top. The inner dish is spaced from the outer dish to receive a heating means such as hot water or a chemical reacting material which maintains the temperature of the food in the dish or trough at a temperature approximately that to which the puppy has been accustomed. Preferably, the weaning dish is made of plastic, although it may be of stainless steel, ceramic ware or some other suitable material. The outer dish and inner dish are preferably frictionally held together so that the inner dish can be removed and turned upside down to rest on the flat top of the central upstanding member for use as a watering dish.

In the foregoing general description I have set out certain objects, purposes and advantages of my invention. Other objects, purposes and advantages may become apparent from a consideration of the following description and the accompanying drawings in which.

Figure 1:
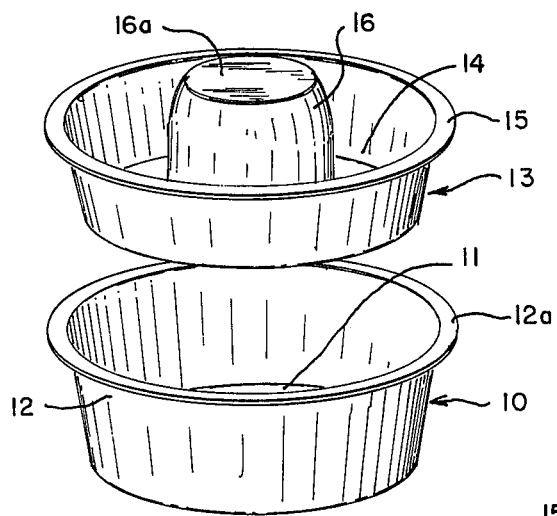
FIG. 1 is an exploded isometric view of a combined weaning, watering and feeding dish according to my invention.
Figure 2:
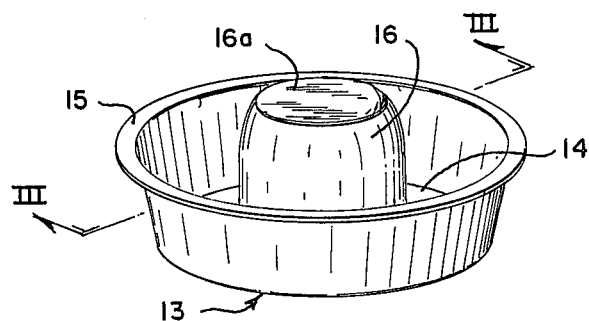
FIG. 2 is an isometric view of the dish of this invention used as a weaning dish.
Figure 3:
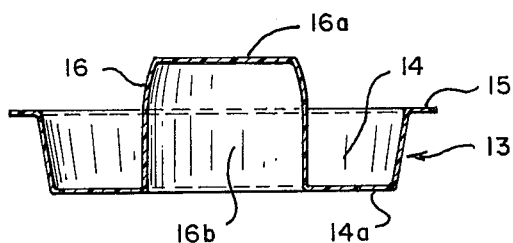
FIG. 3 is a section on the line III—III of FIG. 3.
Figure 4:
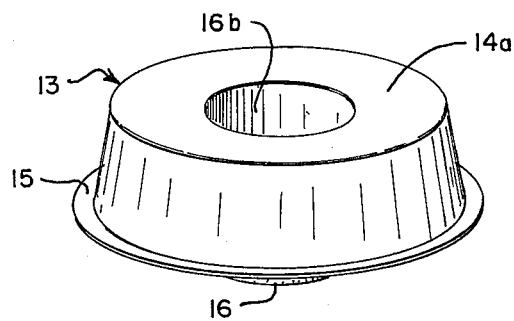
FIG. 4 is an isometric view of the watering dish function of my invention.

Referring to the drawings, I have illustrated an outer dish member 10 having a bottom 11 and an upstanding rim 12. An inner dish 13 having an annular U-shaped trough 14 having a radial edge 15 attached thereto and frictionally fitting within lip 12a of rim 12. An upstanding generally cylindrical member 16 rounded at the top into a flat top closure 16a is attached to the annulus of the annular trough to form a central portion slightly higher than the radial edge 15 of the trough 14. When used as a weaning dish food for the puppy is placed in the trough-like member 14 which is of such shape and size that the young puppy is guided into the trough by the nature of the central member 16 and the annulus, thus preventing his aimless efforts to reach the food and generally discouraging him from walking into the food dish. Warm water, to maintain the food at the temperature of the food to which he has been accustomed, may be inserted into the interior of the outer dish around the inner dish. When used as a watering dish the inner dish member 13 is removed from outer dish 10 and inverted so as to rest on the flat top 16a of the generally cylindrical central member 16. The flat bottom surface 14a of inverted U-shaped annular trough 14 acts to divert the dog's ears away from the water so that they do not become wet, and the hollow generally cylindrical member 16 which is open at the bottom 16b becomes a watering dish. When the weaning of the puppy is completed, the outer dish 10 becomes a separate feeding dish and the inverted inner dish is then used only for watering the dogs.

It will be obvious from the foregoing description that the combined weaning, watering and feeding dish, which is relatively simple and inexpensive to make, will discourage misuse of food and will keep the food in better condition for eating. It solves the problem of watering dogs with long ears. It will also be obvious that while I have illustrated and described a presently preferred embodiment of my invention, the invention may take other forms and embodiments within the scope of the following claims.

I claim:

1. A combined weaning, watering and feeding dish for puppies and like animals, comprising an outer dish member having a bottom and a generally vertically upstanding rim fixed thereto, an inner dish member removably spaced from the outer dish having an annular generally U-shaped trough with an outer sidewall having an outer edge engaging the top of the upstanding rim of the outer dish member to support it centrally therein in a first position adapted to contain a temperature stabilizing means in the area between said inner and outer dishes, and a central upstanding generally cylindrical member in the center of the annulus of said inner dish member spaced from said outer sidewall by a bottom trough surface and extending above the outer edge of said inner dish, said cylindrical member having a flat top closure adapted to support the inner dish in an inverted second position removed from the outer dish member whereby the bottom trough surface of said inner dish acts as an ear protective water dish by diverting a dog's ears away from the cylindrical member in said inverted position.

2. A combined weaning, watering and feeding dish as claimed in claim 1 wherein the inner dish has a radially outstanding lip engaging a radially outstanding lip on the vertical rim of the outer dish.

3. A combined weaning, watering and feeding dish as claimed in claim 2 wherein said inner and outer dishes are frictionally engaged at said radial lips.

4. A combined weaning, watering and feeding dish as claimed in claim 1 wherein said dish is formed of plastic.

* * * * *